April 6, 1954
O. HUKARI
2,674,500
ARTICULATED SUPPORT FOR PLATFORMS
Filed July 28, 1949
2 Sheets-Sheet 1
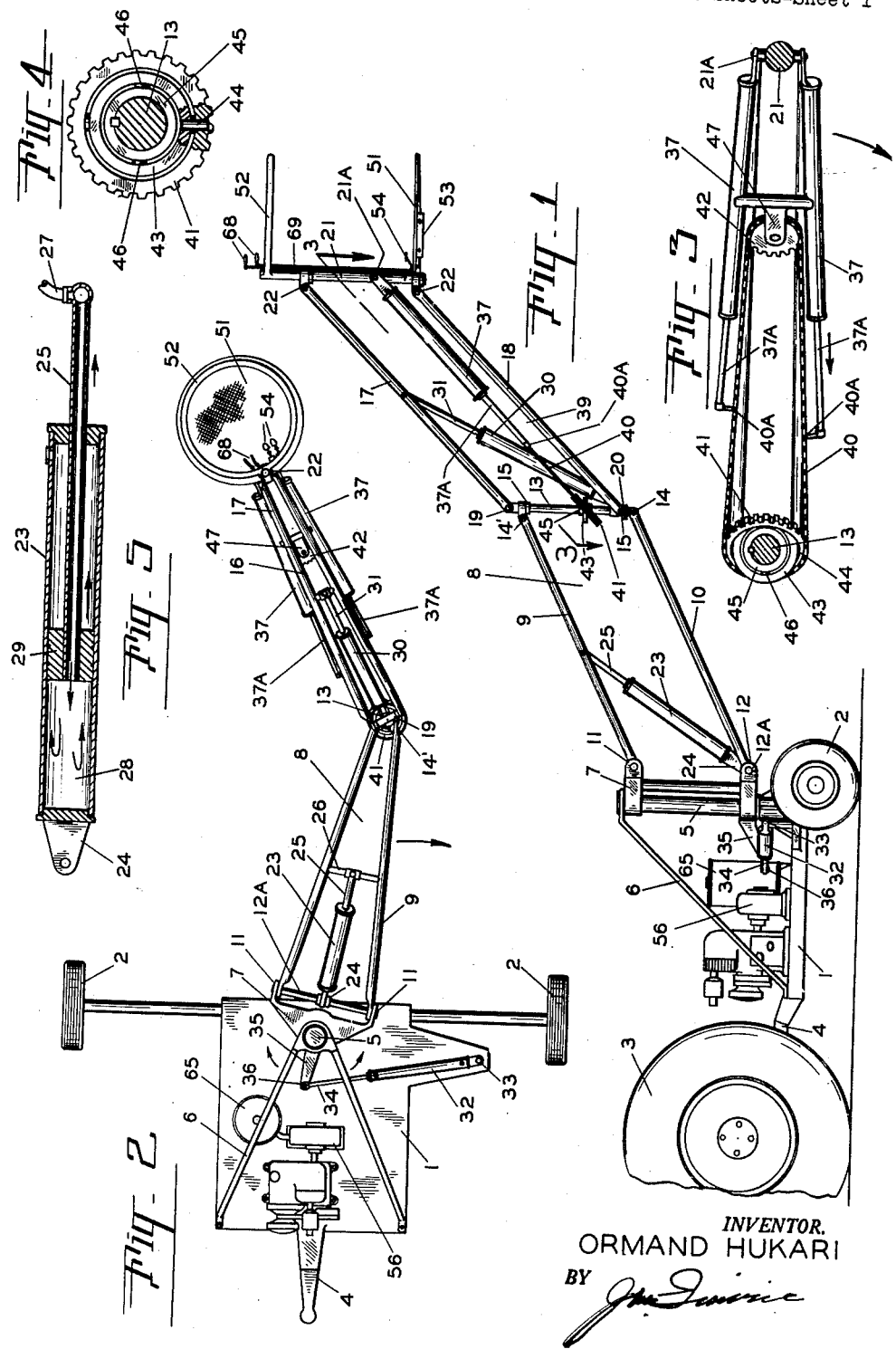
INVENTOR.
ORMAND HUKARI
BY
ATTORNEY April 6, 1954
O. HUKARI
2,674,500
ARTICULATED SUPPORT FOR PLATFORMS
Filed July 28, 1949
2 Sheets-Sheet 2
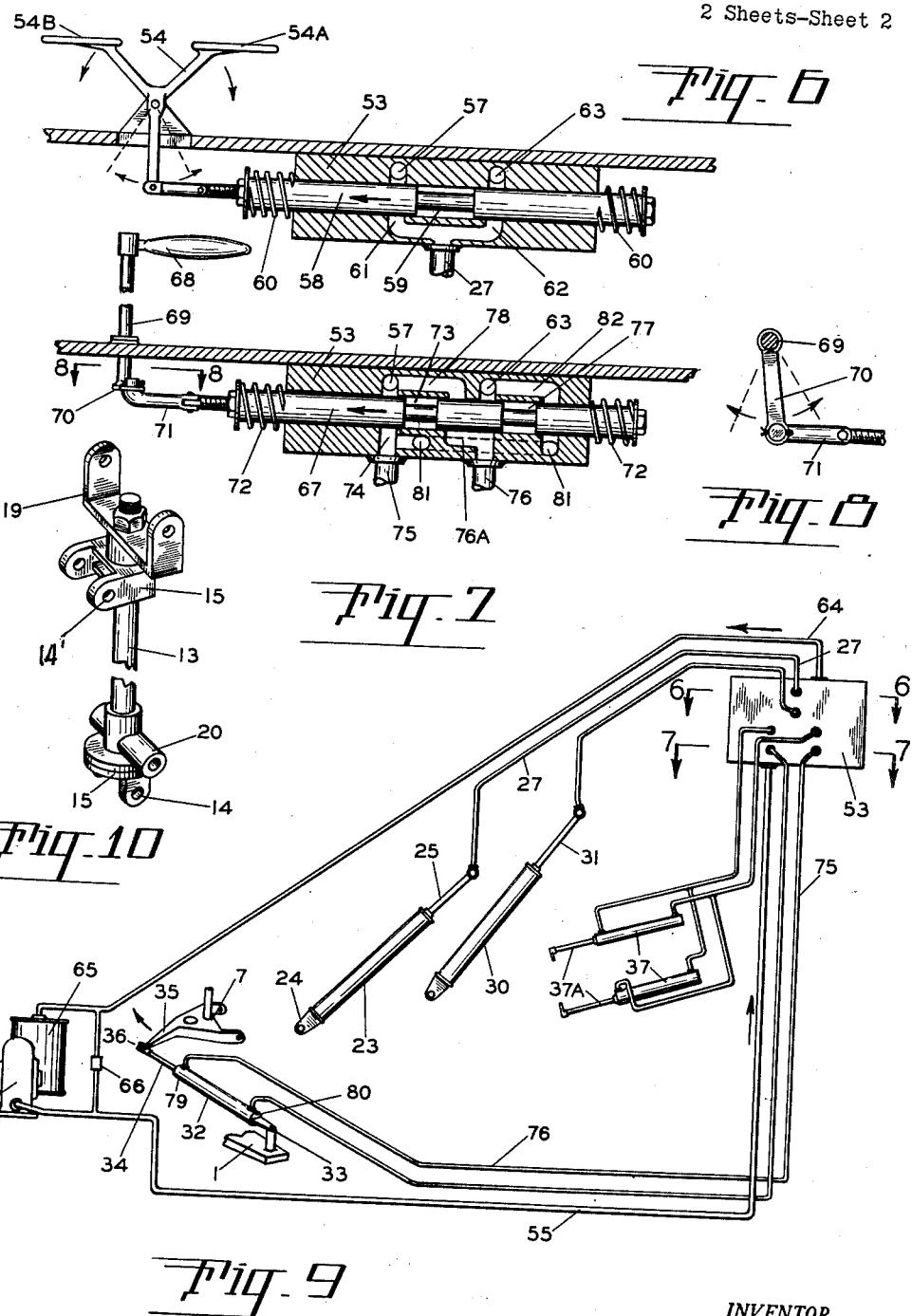

Patented Apr. 6, 1954

2,674,500

UNITED STATES PATENT OFFICE 2,674,500

ARTICULATED SUPPORT FOR PLATFORMS

Ormand Hukari, Hood River, Oreg.

Application July 28, 1949, Serial No. 107,309

8 Claims. (Cl. 304—29)

This invention relates to an articulated support for platforms for workmen and is particularly adapted for utilization in the pruning of trees in orchards and the like.

The primary object of the invention is to provide an articulated support for platforms for workmen to stand on, consisting of power operated booms pivotally joined together in order to position the platform at various elevations, as well as controlling the platform's position on a horizontal plane.

A further object of the invention is to operate the articulated support for platforms by power means, preferably hydraulic, having the control levers located adjacent the platform so that the workmen can position the platform at will.

A still further object of the invention is to mount the articulate platform on a wheeled base so that the said platform can be moved from place to place.

In the operation of my new and improved articulated support for platforms for workmen, the same can be moved between the trees in an orchard upon the wheeled base so that the workmen on the platform can position the platform relative to the individual trees to any vertical height, as well as manipulating the platform around the tree to the point from where he wishes to work.

Due to the fact that the boom is made up of more than one section he can position his platform readily on the opposite side of the tree, as well as the adjacent side of the tree.

These and other objects will be apparent in the drawings, specification and claims.

Referring to the drawings:

Figure 1 is a side elevation of my new and improved articulated support for platforms for workmen.

Figure 2 is a plan view of Figure 1.

Figure 3 is a detailed sectional view, taken on line 3—3 of Figure 1 illustrating the mechanism for actuating one of the booms relative to its horizontal position.

Figure 4 is an enlarged sectional detail, taken of one of the universal gear elements of the mechanism shown in Figure 3.

Figure 5 is a longitudinal sectional view taken through one of the hydraulically operated cylinders for manipulating the booms.

Figure 6 is an enlarged sectional view of one of the fluid control valves used in supplying fluid to the hydraulic cylinders for raising and lowering the booms, taken on line 6—6 of Figure 9.

Figure 7 is an enlarged cross sectional view of the hydraulic control valve for controlling the radial movement of the platform, taken on line 7—7 of Figure 9.

Figure 8 is a fragmentary sectional view of the link controls for operating the valves illustrated in Figure 7, the same taken on line 8—8 of Figure 7.

Figure 9 is a diagrammatical layout of the hydraulic cylinders, hydraulic pump and reservoir, including the fluid control valves.

Figure 10 is a perspective detail of the connection between the primary and secondary boom.

Referring more specifically to the drawings:

My new and improved articulated support for platforms for workmen consists of a base frame 1, mounted upon wheels 2 at its one end, and secured to a tractor 3 by way of the tongue 4 at its opposite end.

Extending upwardly from the base 1 is a rigidly mounted vertical pedestal 5 braced to the base by the braces 6. Rotatably mounted on the pedestal 5 is a bracket 7. A primary boom 8, consisting of an upper beam 9 and a lower beam 10 is mounted to the said bracket. The upper beam is pivotally mounted at 11 to the bracket 7 and the lower beam 10 is pivotally mounted to the bracket 7 at 12.

A vertical shaft 13 is fixedly secured to the brackets 15, which in turn are pivotally connected to the beams 9 and 10 at 14 and 14'. A secondary boom 16 comprises upper and lower beams 17 and 18, said beams being pivotally connected to the brackets 19 and 20, which in turn are rotatably mounted to the vertical shaft 13, the said beams having their opposite ends pivotally connected to the vertical shaft 21 at 22. The booms 8 and 16 are in the form of parallelograms so that when they are raised and lowered the vertical shafts 13 and 21 will remain in a vertical position.

The primary boom 8 is raised and lowered by the hydraulic cylinder 23, having its lower end 24 pivotally connected to the cross shaft 12A and its piston rod 25 pivotally connected to the cross shaft 26, which is secured to the upper beam 9.

Referring to Figure 5, when hydraulic fluid is applied to the cylinder 23, it enters by way of the flexible hose 27, passes through the piston rod 25 into the cylinder at 28 forcing the piston 29 to the right as viewed in Fig. 5 to consequently raise the boom 8. The application of fluid will be described more fully later on in this specification.

The secondary boom 16 is similarly raised and lowered by the hydraulic cylinder 30 and its piston rod 31. Both of the booms 8 and 16 are rotated circumferentially around the pedestal 5 on the base frame 1 by the action of the double acting hydraulic cylinder 32, Figure 2, which is pivotally mounted to the frame base at 33, and has its piston rod 34 pivotally connected to the crank 35 at 36. The crank 35 forms part of the bracket 7. The operation of this cylinder will be described later on.

The secondary boom 16 is rotated about the vertical shaft 13 by the hydraulic cylinders 37. The cylinders 37 are pivotally connected to the vertical shaft 21 at 21A and have their piston rods 37A connected to the chain 40 at 40A, referring to Figures 1 and 3. The chain 40 is trained about the ring gear 41. The ring gear 41 is pivotally connected to the ring 43 by way of the pins 44, referring to Figure 4. The ring 43 in turn is pivotally connected to the hub 45 by way of the pins 46, and the said hub is keyed to the vertical shaft 13.

When the piston rods 37A are moved by hydraulic means they rotate the chain 40 about the idler sprocket 42, which is journalled to the bracket 47 mounted between the cylinders 37. At the same time the said chain rotates about the sprocket 41, which is held stationary by the vertical shaft 13, through the universal arrangement illustrated in Figure 4. This causes the secondary boom 16 to be revolved about the vertical pivot shaft 13, referring particularly to Figure 2. This action will be further described later on.

Secured to the underside of the platform 51 is a hydraulic control valve 53, which I will now describe in connection with the operation of my articulated platform for workmen. Referring to Figures 6, 7 and 9, the raising and lowering of the booms 8 and 16 is accomplished as stated above by the single acting hydraulic cylinders 23 and 30. These cylinders are operated from the fluid control valve indicated in Figure 6. This valve is operated by the foot pedal 54. The valve receives hydraulic fluid under pressure through the pipe line 55 which connects the hydraulic pump 56 to the port 57, within the valve body.

The flow of fluid through the valve is controlled by the plunger 58, which is cut away at 59. This plunger is held in the position illustrated in Figure 6 by the action of the centering springs 60. We will now assume we are going to raise either the boom 8 or the boom 16. There would be two valves such as the one illustrated in Figure 6, one for each cylinder and one foot control lever 54 for each cylinder, both identical.

We will assume that the pedal 54A is placed down, this will move the plunger 58 in the direction of the arrow, uncovering the port 57 and the port 61. This will deliver hydraulic fluid under pressure through the flexible hose 27 into the piston rod 25 and the cylinder 23 raising the boom 8. When the foot is removed from the pedal 54A the plunger 58 will return to the position illustrated, stopping the flow of fluid in either direction through the hose 27, thereby holding the piston 29 of the cylinder 23 in locked position, supporting the boom 8.

When it is desired to lower the boom 8 the pedal 54B will be pressed moving the plunger 58 in the opposite direction of the arrow, permitting the fluid to flow out of the cylinder 23 through the hose 27 into the port 62 and out the exhaust port 63 into the hose 64 back to the reservoir 65. A relief valve 66 is provided for bypassing the fluid while the plungers 58 are in position for blocking off the flow of hydraulic fluid to either of the cylinders 23 or 30.

I will now describe the operation of the rotation of the boom 8 about the vertical pedestal 5 and the boom 16 about the vertical shaft 13. The operation of the double hydraulic cylinder 32 for rotating the boom 8 about the pedestal 5 will now be described. Referring to Figure 7, the valve plunger 67 is operated by the hand lever 68 through the action of the vertical shaft 69, crank 70, and connecting link 71. The plunger is normally held in the position illustrated in neutral by the action of the centering springs 72. By moving the plunger in the direction of the arrow hydraulic fluid under pressure will be delivered by the flexible tubing 55 into the port 57, through the cutaway portion 73, and thence out of the port 74 through flexible tubing 75 to the cylinder 32, thus rotating the bracket 7 in the direction of the arrow, Figure 9, together with the boom 8, referring to Figure 2.

By allowing the plunger 67 to return to the position shown, the position of the boom will be held by the trapped hydraulic fluid within the cylinder 32 and the hose line 75. The hydraulic fluid located in the opposite end of the cylinder 32 from that which the hydraulic fluid entered against the piston is released or exhausted by way of the hose line 76, port 76A, out the port 63 by way of the cross port 77 of the plunger 67, permitting the movement of the piston within the cylinder 32.

When the handle 68 is moved in the opposite direction, the plunger 67 will be moved in the opposite direction of the arrow, permitting the hydraulic fluid pumped through the hose line 55 into the port 57 to follow the cross port 78 through the cutaway portion 73 of the plunger 67 into the port 76A and flow through the hose line 76 into the end 79 of the cylinder 32 forcing the piston in the opposite direction, thus exhausting the fluid out through the end 80 of the cylinder into the hose line 75 from where it flows into the bypass port 81 through the cutaway 77 of the plunger 67 into the cross port 82, and out through port 63 and the exhaust line 64 to the reservoir 65. The operation of the cylinders 37 is identical to that of the cylinder 32 for revolving the boom 16 about the vertical shaft 13.

As explained above the piston rods 37A of the cylinders 37 are fixedly secured to the chain 40 at 40A and due to the fact that the ring gear 41 is held stationary and prevented from rotating by the vertical shaft 13, when the piston rods 37A are caused to move in either direction it will rotate the boom 16 about the vertical shaft 13. The idler gear 42 idling or rotating permits this action to take place. The universal arrangement of the gear 41 will allow for the angle between the vertical shaft 13 and the vertical shaft 21 in the raising and lowering of the boom 16.

Although certain specific embodiments of the invention have been shown and described, it is obvious that many modifications thereof are possible. The invention, therefore, is not to be restricted except in so far as is necessitated by the prior art and by the spirit of the appended claims.

What I claim is:

1. An adjustable boom structure for supporting a workman's platform comprising a plurality of parallelogram linkages interconnected in end to end relation and having a common vertical member, means including said common vertical member for pivotally mounting the outermost one of said linkages on the outer free end of the innermost linkage, means supporting the innermost one of said linkages in a manner permitting traversing movement of said boom structure as a unit about a vertical axis, means supporting the platform from the free end of the outermost one of said linkages, means operable to selectively vary the parallelogram configuration of said linkages whereby the boom structure may be elevated and lowered as a unit or said linkages may be individually elevated or lowered to locate the platform at the desired working level, means operable to effect traversing movement of said boom structure as a unit about said vertical axis to thereby horizontally locate the platform in the desired working position, and power means operatively connected between said outermost linkage and said common vertical member and arranged to impart a turning moment to said outermost linkage to effect traversing movement of the individual linkages relatively to each other to thereby horizontally relocate the platform in a new working position remote from and in a different direction to that of said first mentioned working position with the boom structure support remaining in its initial location relatively to the work.

2. An adjustable boom structure for supporting a workman's platform comprising a plurality of parallelogram linkages interconnected in end to end relation and having a common vertical member, a base, means pivotally mounting the outermost one of said linkages on said common vertical member, means supporting the innermost one of said linkages from said base in a manner permitting traversing movement of said boom structure as a unit relative to said base and about a vertical axis, means supporting the platform from the free end of the outermost one of said linkages, means operable to selectively vary the parallelogram configuration of said linkages whereby the boom structure may be elevated and lowered as a unit or said linkages may be individually elevated or lowered to locate the platform at the desired working level, means operable to effect traversing movement of the boom structure as a unit relative to said base and about said vertical axis to thereby horizontally locate the platform in the desired working position, and means including a power actuated endless chain operatively connected between said common vertical member and said outermost linkage and arranged to impart a turning moment to said outermost linkage to effect traversing movement of the individual linkages relatively to each other to thereby horizontally relocate the platform in a new working position remote from and in a different direction to that of said first mentioned working position with the boom structure base remaining in the same location relatively to the work.

3. An adjustable boom structure comprising a plurality of sequentially contiguous parallelogram linkages having a common vertical member and being interconnected in a manner permitting vertical and traversing movements thereof relative to each other, means supporting the inner end of the innermost of said linkages to permit vertical and traversing movements of the latter as a boom structure unit, means operable to vary the parallelogram configurations of each of said linkages, means operable to effect traversing movements of said linkages relative to each other including an actuating mechanism connected between said linkages having a first portion connected to said common vertical member and a second portion connected to the outermost of said linkages to impart a turning moment to said outermost linkage, and means operable to effect traversing movements of said linkages as a boom structure unit.

4. An adjustable boom structure for supporting a workman's platform comprising a plurality of sequentially contiguous parallelogram linkages interconnected in a manner permitting vertical and traversing movements thereof relative to each other, a movable base, means supporting the innermost one of said linkages at its inner end from said base in a manner permitting vertical and traversing movements of said linkages as a boom structure unit relative to said base, means supporting the said platform from the free end of the outermost one of said linkages, pressure fluid means connected between opposed points of each of said linkages and operable to vary the parallelogram configurations thereof, pressure fluid means connected between said base and said innermost linkage and operable to effect traversing movement of said linkages as a boom structure unit relative to said base, and pressure fluid means connected between said parallelograms and arranged to impart a turning moment to said outermost linkage to effect traversing movements of said parallelograms relative to each other.

5. An adjustable boom structure for supporting a workman's platform comprising a plurality of sequentially contiguous parallelogram linkages, means including a non-rotative pintle common to contiguous linkages for interconnecting the same in a manner permitting vertical and traversing movements relative to each other, a base, means supporting the innermost one of said linkages at its inner end from said base in a manner permitting vertical and traversing movements of said linkages as a boom structure unit relative to said base, means supporting the platform from the free end of the outermost one of said linkages, means operable to vary the parallelogram configurations of each of said linkages, means operable to effect traversing movements of said linkages as a boom structure unit relative to said base, and means operable to effect individual traversing movements of said parallelograms relative to each other including a gimbal joint fixedly secured to said non-rotative pintle against rotation thereon, a ring sprocket mounted upon said gimbal joint for universal movement therewith, a freely rotatable second sprocket supported by said outermost linkage, an endless chain trained around said sprockets, and means for turning said chain.

6. An articulated support for platforms comprising a mobile base, a worker's platform, means including primary and secondary booms for supporting said platform from and in offset relation to said mobile base, said primary boom being pivotally mounted upon said mobile base for tilting and traversing movements relatively thereto and said secondary boom being pivotally mounted upon said primary boom for similar movements relatively thereto, means for independently effecting and controlling the tilting and traversing movements of said primary boom upon and relatively to said mobile base, and means for independently effecting and controlling the tilting and traversing movements of said secondary boom upon and relatively to said primary boom.

7. An articulated support for aerial platforms, comprising a mobile base, a pedestal rigidly mounted upon said base adjacent one end thereof, an aerial platform for a worker, means including primary and secondary booms arranged in tandem relation for supporting said aerial platform from and in offset relation to said mobile base, said primary boom being pivotally mounted upon said pedestal for tilting and traversing movements relatively thereto in horizontal and vertical planes and said secondary boom being pivotally mounted upon said primary boom for similar movements relatively thereto, means for independently effecting and controlling the tilting and traversing movements of said primary boom upon and relatively to said pedestal, and means for similarly effecting and controlling the tilting and traversing movements of said secondary boom upon and relatively to said primary boom.

8. In an articulated support for platforms, the combination of a plurality of parallelogram type booms, articulated end to end and connected for pivotal movement both vertically and horizontally relatively to each other, and means for independently effecting vertical and horizontal pivoting of said booms.

References Cited in the file of this patent

UNITED STATES PATENTS

| Number | Name | Date |
|---|---|---|
| 1,026,380 | Brooks | May 14, 1912 |
| 1,761,726 | Havens | June 3, 1930 |
| 2,391,224 | Carter | Dec. 18, 1945 |
| 2,450,152 | Miller | Sept. 28, 1948 |
| 2,484,709 | Heath | Oct. 11, 1949 |
| 2,500,815 | Gerli | Mar. 14, 1950 |

FOREIGN PATENTS

| Number | Country | Date |
|---|---|---|
| 7,404 | Great Britain | 1913 |